United States Patent [19]

Mally

[11] Patent Number: 5,051,268

[45] Date of Patent: Sep. 24, 1991

[54] METHOD AND APPARATUS FOR TRANSFERRING FOOD MATERIAL STRIPS ONTO A SUPPORT WEB

[75] Inventor: Timothy G. Mally, Oregon, Wis.

[73] Assignee: Oscar Mayer Foods Corporation, Madison, Wis.

[21] Appl. No.: 548,171

[22] Filed: Jul. 5, 1990

[51] Int. Cl.⁵ .................. A23L 1/00; B65B 35/00
[52] U.S. Cl. ...................... 426/420; 53/244; 53/517; 198/462; 271/196; 426/129; 426/414
[58] Field of Search ............. 426/420, 129, 130, 410, 426/414; 53/517, 244, 591; 271/196, 900; 198/428, 462

[56] References Cited

U.S. PATENT DOCUMENTS

| | | | |
|---|---|---|---|
| 3,475,184 | 10/1969 | La Mers et al. | 426/420 |
| 3,481,746 | 12/1969 | Clemens et al. | 426/420 |
| 3,978,642 | 9/1976 | Smithers | 53/517 |
| 4,014,676 | 8/1977 | Smithers | 53/517 |
| 4,020,614 | 5/1977 | Smithers | 53/517 |
| 4,532,751 | 8/1985 | Mally et al. | 53/517 |

*Primary Examiner*—George Yeung
*Attorney, Agent, or Firm*—Lockwood, Alex, Fitzgibbon & Cummings

[57] ABSTRACT

An apparatus for transferring individual strips of material which are sliced from a material supply to a support web includes two counterrotating rollers. The first roller is disposed proximate to a slicing station and material supply while the second roller is disposed proximate to the first roller. Both of the first and second rollers have hollow inner cores which are encircled by rotatable outer shells. A vacuum is drawn in the inner cores of the first and second rollers which causes individual material strips to adhere to the outer shell of the first roller and the support web to the outer shell of the second roller. Bands which encircle the first roller urge the material strips off onto the support web.

50 Claims, 3 Drawing Sheets

METHOD AND APPARATUS FOR TRANSFERRING FOOD MATERIAL STRIPS ONTO A SUPPORT WEB

BACKGROUND AND SUMMARY OF THE PRESENT INVENTION

The present invention relates generally to a method and an apparatus for packaging strips of material and more particularly to a method and an apparatus for transferring a strip of material cut from a supply source to a support web or thin substrate, such as paper, and depositing the strip on the support web at a predetermined location and having a predetermined spacing between successive strips.

Various devices are known in the meat production line field for the transfer of food material strips, such as bacon slices, to a support web for conveyance to a packaging station. In the transfer of the slices from the supply to the support web, the individual strips or slices must be assisted as they travel from the bacon supply to a supply stack or a take-off conveyor. Quite often, the slices are transferred by way of a mechanical pin or other member which engages them and flings them through the air space separating the material supply and a slice receiving means.

This method has a number of drawbacks. One drawback is that the operating speed of the mechanical member is limited because the slice encounters air resistance as it is thrown through the air, and the travel of the slice through the air and the resultant placement thereof becomes random rather than ordered. In addition, the texture of the sliced product and the temperature of it may affect the speed of operation. Thus, the exact placement onto a support web or take-off conveyor belt is not always ensured with a mechanical transfer system of this type and the operating speed of the entire production is limited by the maximum operating speed of the transfer member.

Quick transfer of the material strips and the exact placement thereof on a support web is desirable in order to allow the slicing and packaging components of the production line to operate at their most efficient speeds. Additionally, accurate registration of the individual material strips on the support web is desirable to ensure that when the support web is severed after the strips have been placed thereon, the severing device engages the support web at a gap which occurs between individual slices and not at a location where the severing device engages a slice resting on the support web. The present invention provides highly efficient and accurate slice registration, and, when incorporated into an overall slicing and packaging production line, it can facilitate high speed synchronization of all of the production line components, thereby enabling the transfer and packaging components to operate at higher speeds adequate to accommodate high slicing component speeds. Furthermore, by capturing the slices onto a substantially flat surface, the present invention reduces the number of variables such as meat temperature, slice thickness and meat texture which can affect the meat slicing speed. At high speeds, the present invention virtually allows the "printing" of the material strips onto the support web.

By proceeding in accordance with the present invention, material strips which are severed from a material supply are transferred to a first rotating drum located proximate to the slicer. The slice is transferred pneumatically, by way of negative air pressure, and adhered to the outer rotating surface of the first drum and held in place while the drum rotates a predetermined distance. A second driven rotating drum is arranged proximate to and generally underneath the first drum and conveys a continuous support web to a location proximate to the first drum. When the material slice is positioned adjacent to the intended deposit location on the support web, the slice is urged off of the first rotating drum outer surface and onto the support web.

The rotational speed at which each of the first and second drums rotate can be independently controlled to allow the material slices to be deposited on the support web in a variety of predetermined spacings. The negative air pressure which is used to adhere the severed slice to the first drum outer surface eliminates the need for a purely mechanical transfer member. By positioning the first drum closely adjacent the material supply, the distance which the slice must travel to reach the rotating drum is reduced to a minimum. Positive air pressure can be used to transfer the slice off of the first drum onto the support web. Alternatively, the slices can be urged off the first drum outer surface by extended elastic bands. Consequently, the positioning of the slices on the first drum can be positively controlled and the speed thereof can be varied to ensure accurate spacing required between successive slices.

Accordingly, it is a general object of the present invention to provide an improved apparatus for transferring material slices from a slicing station to a support web.

Another object of the present invention is to provide an improved apparatus and method whereby individual, successive material slices are tranferred from a slicing station onto a packing substrate which is conveyed to a downstream forming assembly or the like.

Another object of the present invention is to provide an improved apparatus for depositing material slices on a continuous support web which includes two rotating drums operatively associated with each other in which the first rotating drum attracts and receives the slice on its outer surface and deposits the slice on a continuous support web conveyed by the second rotating drum to a position proximate the material slice.

Yet another abject of the present invention is to provide an improved slicing and packaging apparatus including a material slicing station, a station for transferring successive material slices to a continuous support web to form a slice-support web assembly, and a station for forming successive slice-support web assemblies into a form suitable for packaging, wherein the transfer station includes rotating means for transferring sliced material strips to a continuous support web moving in synchronization with the rotating transfer means.

It is yet a further object of the present invention to provide a transfer apparatus having two counterrotating operatively associated drums, the first rotating drum having a generally cylindrical outer surface rotating around an inner core, the inner core having a first pneumatic means operatively associated therewith which utilizes negative air pressure to adhere material strips to the drum outer surface, the inner core also including second pneumatic means which utilizes positive air pressure to urge successive material slices off of the outer surface of the first rotating drum, the second rotating drum also having a first pneumatic means operatively associated therewith which applies a negative air pressure to a preselected portion of the second drum outer surface to adhere a continuous support web thereto, the first rotating drum second pneumatic means urging successive material slices off of the first drum outer surface and onto the continuous support web.

It is still another object of the present invention to provide an improved meat slice transfer apparatus which "prints" individual successive meat slices in registration upon a moving substrate web of packing paper.

These and other features and objects of the present invention will become more apparent from a reading of the following detailed description.

DETAILED DESCRIPTION OF THE PREFERRED EMBODIMENTS

Figure 1:
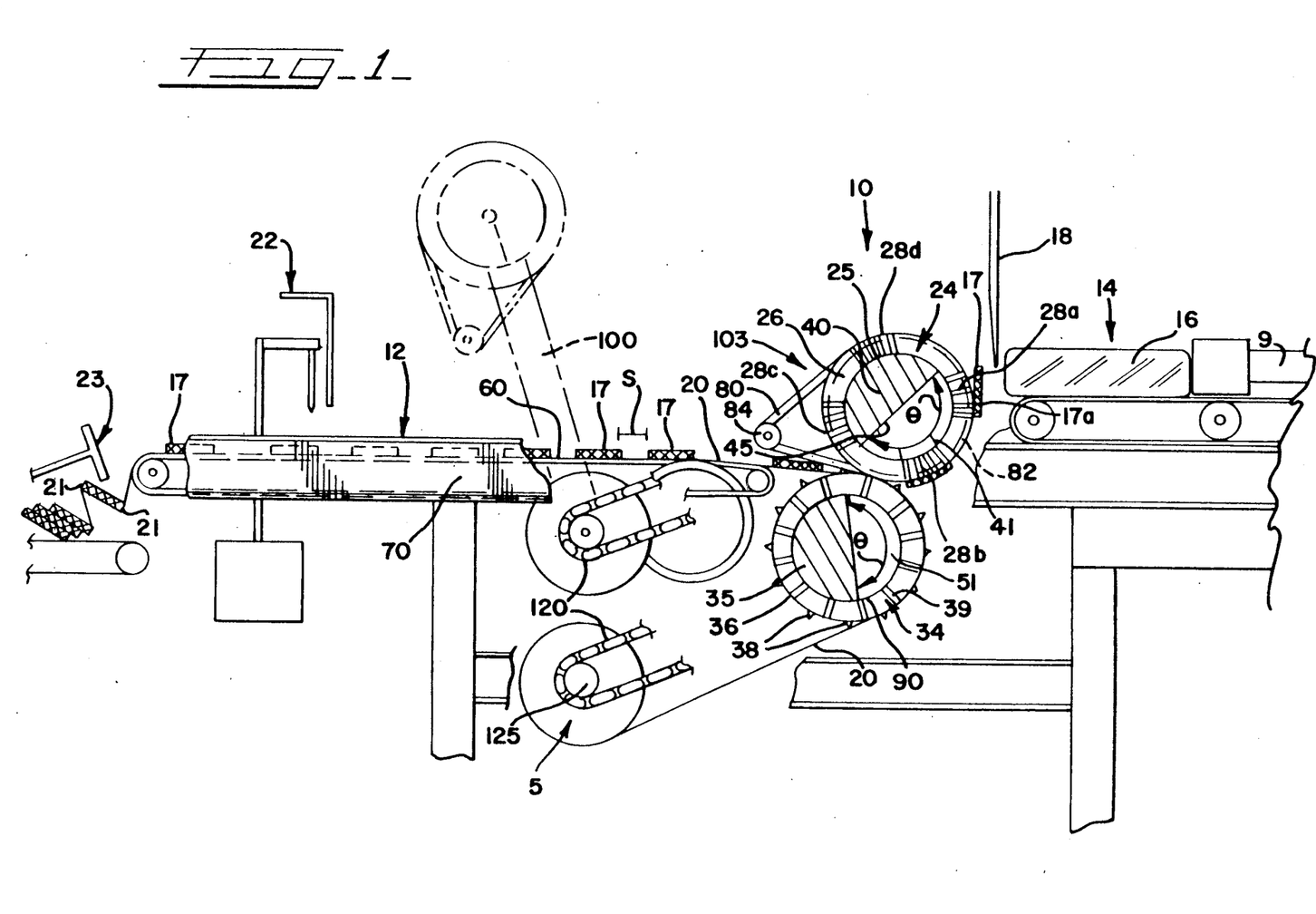
FIG. 1 is an elevational, partially cut-away view of an improved alignment and separation apparatus constructed in accordance with the principles of the present invention. For purposes of illustration only, the machine is shown as operating upon bacon.

FIG. 1 illustrates a material transfer apparatus 10 constructed in accordance with the principles of the present invention in place within a slicing and packing production line 12. Although the improved apparatus and methods which are described in the detailed description which follows will be particularly described in connection with the slicing, transfer and packaging of bacon slices, it will be appreciated that the present invention will have bring substantially equal advantages to the slicing, transfer and packaging of other perishable meat food products.

The transfer apparatus 10 itself is preferably located downstream of a slicing station 14 in which a supply of food material to be sliced, shown as a belly of bacon 16, is moved into contact with an automated, rotating slicing knife or blade 18 by way of a material feed assembly 9. In an actual production line, a guilotine-type cutter assembly 22 may be provided to cut lengths of the support paper or other substrate, from the substrate web 20, such as the illustrated paper roll, after the bacon has been deposited thereon. In certain operations, it may be advantageous and desired to cut the substrate before the bacon is deposited thereon in order to provide pre-cut assemblies of bacon and substrate. A forming station 23 for assembling a predetermined length of support web 20 into a format suitable for packaging such as by folding the combined strip substrate assembly upon itself along potential transverse lines of folding 21 in a shingled stack as shown, may also be provided further downstream of the transfer apparatus 10.

Turning now to the particular details of the transfer apparatus 10, it can be seen that it includes first and second rotating means in the form of two counterrotating rollers or drums 24 and 34 disposed generally adjacent to each other. The first rotating drum 24 is mounted transversely across and in front of the material transfer apparatus on a frame 70 so that it can freely rotate in a clockwise direction as shown in FIG. 1. The second rotating drum 34 is also mounted transversely across the frame so that it can freely rotate in a direction opposite to that of the first rotating drum 24 (counterclockwise) as shown in FIG. 1. Both the first and second rotating drums 24, 34 may be driven by belts 120 or gears or by any other suitable drive mechanism.

The first drum 24 has two operating components, one of which is a stationary inner core 25 which has a generally cylindrical configuration. Core 25 has a solid portion 40 and at least one passageway 41. The illustrated passageway 41 extends for substantially the entire length of the drum 24. Each passageway 41 is bounded by the other component of drum 24, namely an outer rotatable shell 26, in order to thereby define a passageway 41 having an arcuate portion extending between spaced edges of the solid portion 40, thereby defining an operational arc length of the first drum 24 between where it first receives a material strip 17 and where it operatively intersects with the support web 20 conveyed by the second drum 34.

In order to facilitate maintenance and cleaning of the first drum 24, the first inner core 25 preferably is fixed to a mounting assembly frame 100 which can pivot upwardly between an operating position and a maintainence position shown in phantom.

Conventional air conduits 106 (FIG. 2), which can be included on the mounting frame 100, extend to the first drum which air conduits are components of a pneumatic assembly for applying negative air pressure to the interior of the first drum 24. Although the conduits 106 are illustrated as terminating adjacent to a first drum inner core stem 71 (FIG. 3), it will be understood that the pneumatic assembly may include an inner manifold 72, (shown in phantom) which extends between the opposite ends of the inner core 25. When a vacuum is drawn through the conduits 106, air is drawn into the passageway 41 from circumferentially spaced apertures 29 through the outer shell member 26. Apertures 29 are disposed in a preslected pattern. Inasmuch as each passageway 41 is fixed in its position relative to the rotatable outer shell 26, the pneumatic assembly provides a vacuum force which adheres individual bacon slices 17 to the outer surface of the first drum through an arc length $\theta$ which begins at a location approximately adjacent the material supply 16 to a location proximate to the point of operative intersection of the first and second drums 24, 34.

Figure 2:
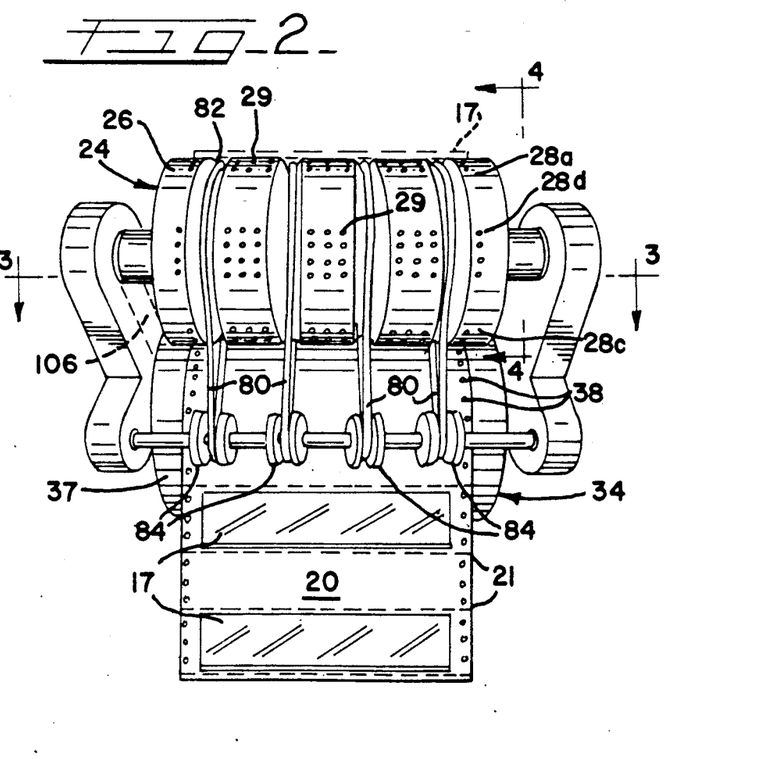
FIG. 2 is a top perspective view showing the first rotating drum and the mechanism for urging the sliced material off of the outer surface of the drum.

As mentioned above, the first drum rotatable outer shell 26 overlies the drum core 25 and provides the outer working surface for the first drum. Apertures 29 are included in a plurality of discrete material receiving portions 28a, 28b, 28c and 28d, which are circumferentially spaced along shell 26. Although four discrete material receiving portions 28a–d are illustrated as an arrangement which is preferable for the illustrated embodiment, it will be noted that the number of such discrete portions is not limited and may include either only one or multiple portions. Preferably, the length and width of each of the discrete material receiving portions 28a–d correspond approximately to the length and width of the material strips being sliced and each material receiving portion 28a is positioned proximate to and opposite of the slicing knife 18.

The solid portion 40 of the inner core 25 serves as a block which shields the rotating arrays of apertures 29 from the vacuum drawn on the first drum inner core 25. The vacuum holding the material strips 17 to the discrete material receiving portions is released when the rotating outer shell 26 encounters and passes over the solid portion 40 of the inner core 25. A separate means for urging the material strips 17 off of the "blocked" apertures 29 ma be provided as discussed in greater detail below.

In operation, the first drum 24 is rotated in synchronization with the slicing knife 18 so that one material strip receiving portion 28a is positioned proximate to and adjacent to the slicing knife 18 at the time when the slicing knife 18 has just completed severing a material strip or slice 17 from the material supply 16. The material strip receiving portion 28a carries the strip 17 around the drum while the next successive strip is being severed from the material supply 16. The strip 17 is then deposited onto a support web 20 passing over the surface of the second drum 34 in a precise known location. The placement of the material strips 17 upon the support web 20, especially the spacing gap S between successive material strips, may be regulated by adjusting the speed of the slicing knife 18 and the first drum 24.

Figure 3:
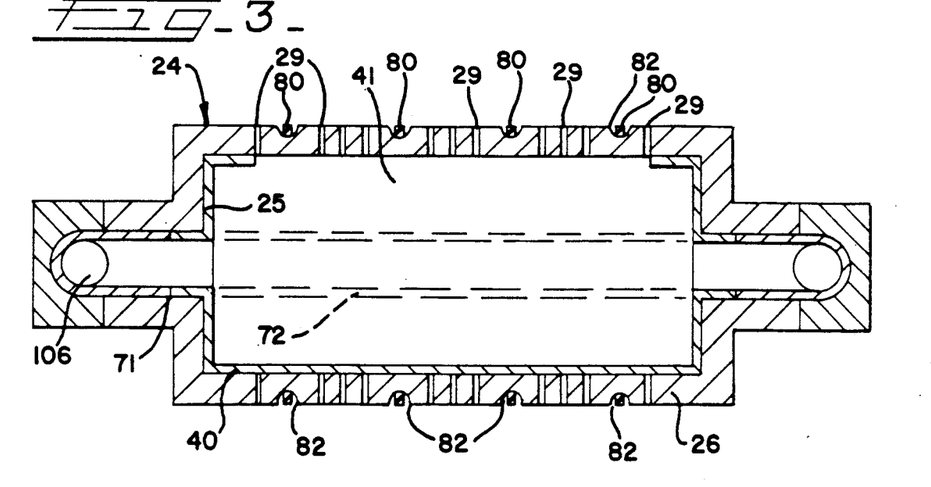
FIG. 3 is a cross-sectional view of the first rotating drum taken along line 3—3 of FIG. 2.
Figure 4:
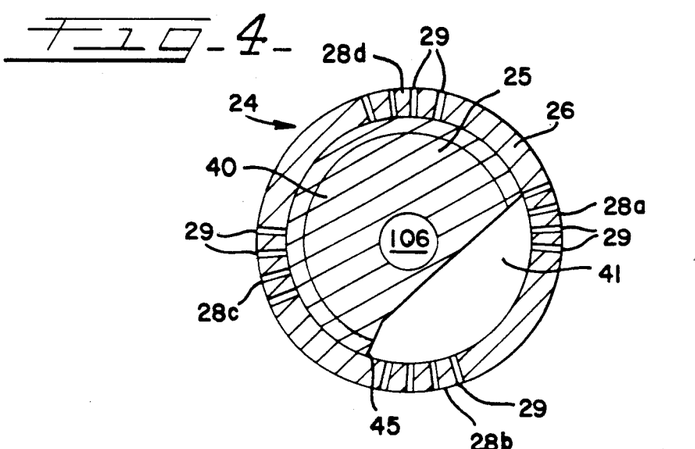
FIG. 4 is cross-sectional view of the first rotating drum of taken along line 4—4 of FIG. 2.

As mentioned above, the present invention may also include means for urging the individual successive material strips 17 off of the outer surface of the rotating shell 26 onto the support web 20. In FIGS. 1, 2 and 3, this takes the form of an assembly including belts 80 which encircle the first drum 24 within a series of separate, axially spaced channels 82 or other means suitable for maintaining the illustrated placement of the belts 80. The belts 80 engage associated pulleys 84 mounted on a tensioning arm assembly which extends across the first drum outer surface 27 and is spaced away therefrom. The belts 80 are preferably positioned apart from the first drum 24 so that they operatively intersect and engage successive individual material strips 17 proximate to the beginning or leading edge 45 of the first drum inner core solid portion 40. The belts 80 thereby assist in urging the material strips 17 off of the first drum discrete material strip receiving portions 28a-d. Importantly, the urging means will serve to counteract any tendency of the material strips 17 to adhere to the first drum outer surface caused by fat congealing on the surface of the material strips 17. It is preferable to include a number of belts which are adequate to evenly engage and reduce the likelihood of folding over of the material strips 17.

Figure 5:
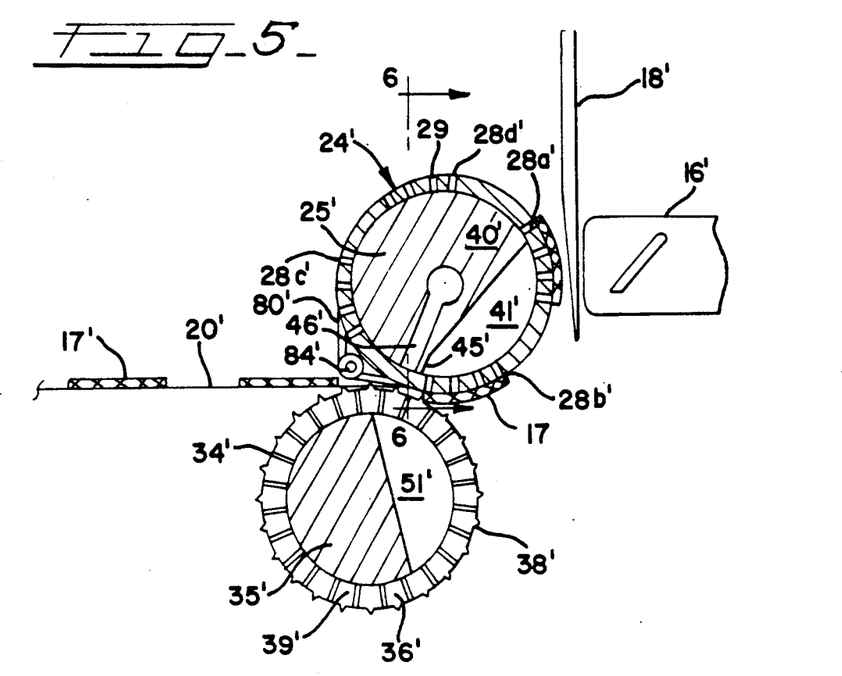
FIG. 5 is an enlarged, primarily elevational view of an alternate embodiment of an improved alignment and separation apparatus of the present invention shown in conjunction with a slicing mechanism.
Figure 6:
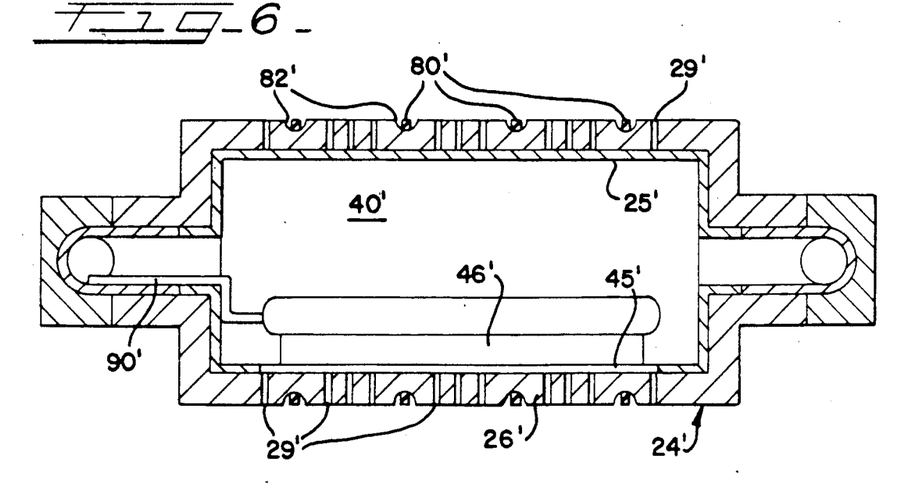
FIG. 6 is a cross-sectional view of the first rotating drum of the alternative embodiment taken along the line 6—6 of FIG. 5.

An alternate means for urging the material strips 17 off of the first drum discrete portions 28a-d in the form of an additional pneumatic assembly is illustrated in FIGS. 5 & 6. An air conduit 90' supplies a stream of positive air pressure to a portion of the rotatable outer shell 26' so that an advancing discrete material strip is positively urged off of the first drum 24' and onto the support web 20'. Conduit 90' runs along the interior of the inner core member 25' and terminates at an edge 46' interior of the inner core leading edge 45'. One or more belts 80' may also be used in conjunction with the positive air pressure assembly.

With more particular reference to the second drum 34, it preferably includes a stationery inner core member 35 which has a generally cylindrical configuration. The core 35 has a solid portion and at least one passageway 51 which extends for substantially the entire length of the second drum 34. The passageway 51 is bounded by an outer rotatable cylindrical shell 36 which defines the passageway 51 as having an arcuate portion extending between spaced edges of the inner core member 35, thereby also defining an operational arc length of the second drum 34 between where it first receives the support web 20 and where the support web 20 leaves the second drum 34. The second drum inner core member 35 also includes a pneumatic assembly including air conduits 110 leading to its interior for applying negative air pressure to the interior of the second drum 34. When a vacuum is drawn through the air conduits 110, air is drawn into the passageway 51 from circumferentially spaced apertures 39 through the outer rotatable shell 36. The second drum passageway 51 is fixed in its position relative to the outer rotatable shell 36 and thus the second drum pneumatic assembly provides a vacuum force which adheres the support web 20 to the outer surface of the second drum through an arc length $\phi$ which begins approximately at an area where the second drum 34 first receives the support web 20 from the supply roll 5 to an area where the support web 20 leaves the second drum outer surface 37 and engages a take off conveyor 60. This arc length is approximately 180°.

The apertures 39 extend through the outer shell 36 into the inner core 35 and are preferably spaced equally apart on the outer surface thereof so that they adhere the continuous support web 20 to the second drum outer surface. In this manner, the support web 20 is substantially flat during the transfer of material strips 17 from the first drum 24 to the support web 20. Additionally, the second drum outer shell 36 may also include a series of radially extending lugs or pins 38 which are dimensioned to engage registration holes disposed in the support web 20 which assist in accurately positioning the support web 20 on the second drum 34. The second drum pins 38 may be located on the opposite ends of the second drum 34, so as to engage registration holes in opposite sides of the support web 20, or they may be disposed in the center of the support web 20.

In operation, a vacuum is drawn through the second drum interior air conduits, creating a vacuum in the second drum in the inner core 35. Air is drawn into the second drum passageway 51 from the circumferentially spaced apertures 39 through the outer shell member 36. Apertures 39 are disposed in the outer shell 36 in a preselected pattern. The passageway 51 is fixed in its position relative to the rotatable outer shell 36, and the second drum pneumatic assembly provides a vacuum force which adheres the support web 20 to the outer surface of the second drum through the arc length $\phi$. A supply of material for the continuous support web 20 is carried on a roller 125 supported underneath the second drum 34. The negative air pressure created in the inner core 35 by the vacuum adheres the support web 20 to the outer surface without wrinkling or misalignment. The support web 20 moves along with the second drum as it rotates counterclockwise until the support web reaches the angular position where the air apertures 39 are blocked by the leading edge 90 of the inner core member 35, at which point the support web 20 is readily released from the second drum outer surface 37.

The support web is then conveyed in any suitable conventional manner downstream to subsequent processing stations. As mentioned before, these subsequent processing stations may include a cutting station for cutting the support web 20 into preselected lengths and/or a folding station where the support substrate 20 is folded while the material strips 17 are on it in order to provide an assembly for a particular type of packaging, such as the illustrated shingled stacking with the substrate folded between successive material strips. This type of packaging is facilitated when the substrate web includes a plurality of transverse folding locations 21 provided by fold lines or lines of weakening such as perforations which are longitudinally spaced along the substrate web. It will be appreciated that the rotating positions of the material strip receiving portions 28a-d of the first rotating drum 24 may be timed so as to be aligned with the spacing between such folding locations of the support web 20 carried by the counterrotating second drum 34. This effects precision location characteristics so that the strip-laden support web can be appropriately folded. At high speeds, the present invention virtually allows the "printing" of the material strips onto the support web.

It will be seen that while certain embodiments of the present invention have been shown and described, it will be obvious to those skilled in the art that changes and modifications may be made therein without departing from the true spirit and scope of the invention.

I claim:

1. An apparatus for transferring strips of material severed from a food material supply to a support web, comprising: first rotating means disposed proximate to the material supply, the first rotating means having an outer surface with at least one discrete material strip receiving portion thereon adapted to receive successive material strips severed from the material supply, said first rotating means having first pneumatic means for applying negative air pressure to said at least one discrete material strip receiving portion, second rotating means operatively associated with said first rotating means, the second rotating means being adapted to receive a continuous support web on an outer surface thereof, said second rotating means further being adapted to convey the continuous support web to a location proximate to said first rotating means, said second rotating means rotating in synchronization with said first rotating means, said second rotating means including second pneumatic means for applying negative air pressure to a portion of the second rotating means outer surface to draw said continuous support web over said second rotating means outer surface, said first rotating means further including means for urging successive material strips off of said first rotating means outer surface and onto said continuous support web.

2. The apparatus of claim 1, wherein said first pneumatic means includes a plurality of air apertures extending through said first rotating means, the air apertures leading from the interior of said first rotating means to said at least one discrete material strip receiving portions of said first rotating means.

3. The apparatus of claim 1, wherein said first rotating means includes a plurality of discrete material strip receiving portions.

4. The apparatus of claim 1, wherein said first rotating means includes four discrete material strip receiving portions.

5. The apparatus of claim 1, wherein said first rotating means includes means for selectively stopping the flow of said negative air pressure to said first rotating means outer surface at least one discrete material strip receiving portion.

6. The apparatus of claim 1, wherein the material strip urging means includes third pneumatic means for applying positive air pressure to said first rotating means outer surface at least one discrete portion.

7. The apparatus of claim 1, wherein said material strip urging means includes band means encircling said first rotating means, a portion of said band means engaging said successive material strips at said first rotating means outer surface at least one discrete material receiving portion.

8. The apparatus of claim 6, wherein said material strip urging means includes band means encircling said first rotating means, a portion of the band means engaging said successive material strips at said first rotating means outer surface at least one discrete material receiving portion.

9. The apparatus of claim 1, wherein said first rotating means includes a stationary inner core having a preselected opening in an outer shell which is rotatable around the inner core, the first pneumatic means applying said negative air pressure to the interior of said inner core, said inner core having an opening in contact with the rotatable outer shell.

10. The apparatus of claim 9, wherein said second rotating means includes a stationary inner member having an opening operatively associated with a rotatable outer shell thereof, the second rotating means outer shell having a plurality of air apertures extending therethrough, said second pneumatic means applying negative air pressure to the interior of the inner member and to said second rotating means outer shell plurality of air apertures by way of said opening.

11. The apparatus of claim 1, wherein said first rotating means includes a stationary inner core having a preselected opening operatively associated with a rotatable outer shell thereof, the first rotating means outer shell having a plurality of first air apertures extending therethrough, said first pneumatic means applying negative air pressure to the interior of the inner core and to said first rotating means outer shell by way of said opening, and said second rotating means includes a stationary inner member having an opening operatively associated with a rotatable outer shell thereof, the second rotating means outer shell having a plurality of second air apertures extending therethrough, said second pneumatic means applying negative air pressure to the interior of the inner member and to said second rotating means outer shell air apertures by way of said opening.

12. The apparatus of claim 1, wherein said first and second rotating means are driven in synchronization with a means for severing succesive material strips from said food material supply whereby said at least one discrete material strip receiving portion of said first rotating means outer surface is proximate to said food material supply.

13. The apparatus of claim 1, wherein said second rotating means includes means for engaging said continuous support web.

14. A machine for slicing strips of food material and transferring the strips of material onto a support web into a format suitable for packaging comprising, in combination:

means for supplying a supply unit of a food material to a slicing station, the slicing station including means for slicing individual strips from the food material supply unit, means for transferring the individual strips from the slicing station and placing said individual strips onto a support web, means for severing a predetermined length of the support web after said individual strips have been placed thereon, means for assembling successive lengths of said support web into a form suitable for packaging, the transferring and placement means including two elongated cylindrical rollers operatively associated with each other and operatively associated with said slicing station, the first roller having a discrete portion defined on an outer surface thereof and adapted to receive an individual material strip after the slicing thereof from said food material supply unit, said first roller having first pneumatic means for adhering said individual material strip to said first roller discrete portion, said first roller also having means for urging said individual material strip off of said first roller discrete portion and onto said support web, the second roller being disposed proximate to said first roller, said second roller including means for engaging said support web and second pneumatic means for drawing said support web over an outer surface of said second roller.

15. The packing machine of claim 14, wherein said first and second rollers are driven in synchronization with each other.

16. The packing machine of claim 14, wherein said first and second rollers are driven in synchronization with said slicing station, whereby said first roller outer surface discrete portion is positioned proximate to said material unit when an individual material strip is s iced from said material unit.

17. The packing machine of claim 14, wherein said first and scond rollers include means for respectively blocking said first and second pneumatic means.

18. The packing machine of claim 14, wherein said first roller has four material strip receiving discrete portions disposed on the outer surface thereof, each of the four discrete portions including a first air passage leading from said first roller outer surface to said first roller first pneumatic means, and said second roller including an air passage leading from said second roller outer surface to said second roller second pneumatic means.

19. The packing machine of claim 14, wherein said first roller slice urging means includes third pneumatic means for supplying positive air pressure to said first roller discrete portion.

20. The packaging machine of claim 19, wherein said first roller slice urging means further includes band means encircling said first roller, the band means engaging said first roller proximate to said third pneumatic means.

21. The packing machine of claim 14, wherein said second roller second pneumatic means includes at least one air passage disposed in the outer surface of said second roller.

22. The packing machine of claim 19, wherein said belt means includes at least one belt encircling said first roller and engaging a circumferential groove of said first roller.

23. The packing machine of claim 14, wherein said means for assembling successive lengths of said support web includes means for transversely folding said support web upon itself along discrete, spaced apart transverse fold lines, each of the transverse fold lines being associated with an individual material strip.

24. In an apparatus for transferring successive material strips cut from a food material supply to a substrate web, the improvement comprising: first rotating means, second rotating means, the first rotating means having a generally cylindrical outer surface, the first rotating means having first pneumatic means for engaging a material strip and holding the material strip on the first rotating means outer surface, the second rotating means having a generally cylindrical outer surface and having second pneumatic means for holding a continuous substrate web to the second rotating means outer surface, the first rotating means further including means for urging said material strip off of said first rotating means outer surface and onto said continuous substrate web.

25. The apparatus of claim 24, wherein said means for urging said material strip off of said first rotating means includes third pneumatic means for selectively applying positive pressure to said first rotating means outer surface.

26. The apparatus of claim 24, wherein said means for urging said material strips off of said first rotating means includes band means operatively intersecting the first rotating means outer surface.

27. The apparatus of claim 26, wherein said means for urging said material strips off of said first rotating means further includes band means engaging said first rotating means, the band means operatively intersecting said first rotating means outer surface.

28. The apparatus of claim 24, wherein said first rotating means includes a rotating drum having a plurality of discrete material strip engaging areas on its outer surface, and said first pneumatic means includes at least one air passage operatively associated with each of said discrete material strip engaging areas, said first pneumatic means further including means for drawing a vacuum through the rotating drum at least one air passage.

29. The apparatus of claim 28, wherein said rotating drum includes four discrete material strip engaging areas and means for blocking the vacuum drawn through said rotating drum air passages.

30. The apparatus of claim 28, wherein said second rotating means includes a rotating drum, the second rotating means rotating drum having a plurality of air passages extending therethrough, said second pneumatic means further including means for drawing a vacuum through said second rotating means rotating drum air passages.

31. The apparatus of claim 24, wherein the outer surfaces of said first and second rotating mean operatively intersect.

32. An apparatus for receiving slices of a meat product and applying it onto an elongated substrate, comprising: a first roller having an elongated, generally cylindrical outer surface with a plurality of discrete meat slice receiving surfaces thereon, the first roller having first means for pneumatically adhering individual, successive meat product slices to the first roller outer surface, said first roller further having belt means for engaging individual, successive meat slices adhered to said first roller outer surface and urging said individual, successive meat slices off of said first roller outer surface and applying said individual, successive meat slices onto an elongated substrate conveyed to an application location proximate and adjacent said first roller by a second roller having an elongated, generally cylindrical outer surface with a plurality of air apertures therein, the second roller having second means for pneumatically adhering said elongated substrate to the outer surface thereof.

33. The meat product application apparatus of claim 32, wherein said meat slice urging means includes third means for pneumatically removing said individual, successive meat slices from said first roller outer surface.

34. A machine for transferring material strips sliced from a food material supply to a support web to form a support web-material strip assembly and forming the support web-material strip assembly into a format suitable for packaging, comprising, in combination:
  means for supplying a supply unit of a food material to a slicing station,
  a slicing station including means for slicing successive individual strips from the food material supply unit,
  means for transferring the successive individual material strips from the slicing station and placing the individual material strips onto a length of support web, the transfer and placement means including two elongated rollers operatively associated with each other, the first roller having at least one discrete portion defined on an outer surface thereof and adapted to receive an individual material strip thereon after slicing from said material supply unit, said first roller having first pneumatic means for adhering the individual material strip to said first roller at least one discrete portion, the second roller being disposed proximate to said first roller, said second roller having second pneumatic means for adhering a support web over an outer surface of said second roller, said first roller also including means for urging said individual successive material strips off of said first roller at least one discrete portion and onto the support web in a predetermined spacing and in alignment with a potential line of folding associated therewith,
  means for supplying a length of said support web to said second roller, and
  means for folding said support web along each of the support web potential lines of folding such that said support web is folded between successive individual material strips.

35. The machine of claim 34, wherein said first and second rollers include means for blocking said respective first and second pneumatic means.

36. The machine of claim 34, wherein said first and second rollers are driven in synchronization with each other.

37. The machine of claim 14, wherein said first and second rollers are driven in synchronization with said slicing station, whereby said first roller at least one discrete portion is positioned proximate to said material unit when an individual material strip is sliced from said material supply unit.

38. The machine of claim 14, wherein said first roller has four material strip receiving discrete portions disposed on the outer surface thereof, each of the four discrete portions including a first air passage leading from said first roller outer surface to said first roller first pneumatic means, and said second roller including an air passage leading from said second roller outer surface to said second roller second pneumatic means.

39. The machine of claim 34, wherein said support web is a continuous length of support web.

40. The machine of claim 34, wherein said second roller includes means or engaging said support web.

41. The machine of claim 34, further including means for urging said individual successive material strips off of said first roller at said at least one discrete portion and onto said support web.

42. A method of transferring material strips from a food material supply to a substrate web, comprising the steps of:
  feeding a supply of a food material to a material cutting location;
  providing a first roller adjacent to the material cutting location, the first roller having a food material strip engaging portion;
  providing a second roller adjacent to said first roller;
  feeding a substrate web over the second roller and drawing a vacuum at one area of said second roller to adhere the substrate web to a portion of said second roller;
  engaging a food material strip with the first roller after the food material strip is cut from the food material supply by drawing a vacuum at said first roller material strip engaging portion;
  rotating said first roller to transfer said food material strip from said food material supply to a material transfer location, and rotating the second roller to advance said substrate web to the material transfer location; and
  urging said food material strip off of said first roller and onto said substrate web of said second roller.

43. The method of transferring strips according to claim 42, further including the step of releasing the vacuum drawn at said first roller material strip engaging portion after said first roller is rotated to said material transfer location and before said material strip is urged off of said first roller.

44. The method according to claim 42, further including the steps of:
  releasing said vacuum drawn at said first roller material strip engaging portion after said first roller is rotated to said material transfer location and before said material strip is urged off of said first roller; and
  releasing the vacuum drawn at said second roller one area of the said material strip is urged off of said first roller and onto said substrate web.

45. The method of claim 42 including the step of applying positive air pressure to said material strip to urge said material strip off of said first roller.

46. The method of claim 44, wherein said material strip is urged off of said first roller by at least one belt encircling said first roller in a circumferential groove.

47. The method of claim 42, wherein the step of urging said material strip off of said first roller includes the steps of: applying air pressure to said material strip at said material strip transfer location and engaging said material strip at said material strip transfer locations of a band encircling said first roller in a circumferential groove.

48. The method of claim 42, further including the steps of urging said material strip off of said first roller onto said substrate web proximate to a transverse fold line of said substrate and folding said substrate web upon itself along the transverse fold line.

49. The method of claim 42, wherein said material strip is a strip of bacon.

50. A method of transferring strips of food material, comprising: the steps of rotating a first roller so that the first roller engages, on an outer surface thereof, an individual food material strip by way of applying a vacuum through said first roller to the individual food material strip, passing a substrate web over a second roller to a location proximate to said first roller, adhering the substrate web to an outer surface of said second roller by applying a vacuum through said second roller to said substrate web, rotating the first roller so that said individual food material strip is closely adjacent said second roller substrate web and urging said individual food material strip off of said first roller and onto said substrate web by applying positive air pressure through said first roller to said individual food material strip.

* * * * *